(12) United States Patent
Skalicky

(10) Patent No.: US 8,787,961 B2
(45) Date of Patent: Jul. 22, 2014

(54) SAFETY AND TRACKING SYSTEM AND RELATED DEVICES

(76) Inventor: Gene Ryan Skalicky, Fort Wayne, IN (US)

( * ) Notice: Subject to any disclaimer, the term of this patent is extended or adjusted under 35 U.S.C. 154(b) by 528 days.

(21) Appl. No.: 13/205,092

(22) Filed: Aug. 8, 2011

(65) Prior Publication Data

US 2012/0034946 A1    Feb. 9, 2012

Related U.S. Application Data

(60) Provisional application No. 61/372,080, filed on Aug. 9, 2010.

(51) Int. Cl.
*H04B 7/00* (2006.01)

(52) U.S. Cl.
USPC ......... 455/521; 455/3.03; 455/41.2; 455/500; 455/63.4; 340/539.11; 340/539.22

(58) Field of Classification Search
CPC ....... H04W 4/22; H04W 84/18; H04W 16/28; H04L 29/08108; H04B 7/0413; G08B 25/016; A61M 5/14244

USPC .............. 455/521, 3.03, 41.2, 41.3, 500, 507, 455/63.4; 340/539.1, 539.11, 539.22, 340/539.23; 315/291; 342/456; 702/28
See application file for complete search history.

(56) References Cited

U.S. PATENT DOCUMENTS

2002/0087436 A1 * 7/2002 Guthrie et al. .................. 705/28

* cited by examiner

*Primary Examiner* — Shaima Q Aminzay
(74) *Attorney, Agent, or Firm* — Michael Ries

(57) ABSTRACT

The present invention is a safety and tracking system that includes a master or master control unit with visual and audible signal intensity indicators, a numerical indicator, a plurality of manual control buttons that provide input data to the master control unit, a plurality of indicator lights with audible sounder, a controlled gain antenna array that exchanges, sends and receives the input data, a transceiver that provides a communications link between the master control unit and a locator tag and a microprocessor. There are also one or more corresponding target or locator tags that include a panic button, an indicator lights with a sounder, an antenna that exchanges, sends and receives the input data, a transceiver and a microprocessor to coordinate the input data to the master control unit.

19 Claims, 6 Drawing Sheets

SAFETY AND TRACKING SYSTEM AND RELATED DEVICES

This application claims priority to U.S. Provisional Application 61/372,080 filed on Aug. 9, 2010, the entire disclosure of which is incorporated by reference.

TECHNICAL FIELD & BACKGROUND

The present invention generally relates to a safety and tracking system. More specifically, the invention is a safety and tracking system and related devices.

It is an object of the invention to provide a safety and tracking system that provides an agile antenna array that switches between a unidirectional monitoring antenna to a directional tracking antenna if a tag unit breaches a defined distance.

It is an object of the invention to provide a safety and tracking system that controls power output in a tag unit to control the range of the unit for optimal operation at relative near and long distances.

It is an object of the invention to provide a safety and tracking system that has master control units that will not interfere with other tag units that have not been connected to the master control units where multiple people are using the system in the same area.

It is an object of the invention to provide a safety and tracking system where if a locator tag is out of the selected range the device will alarm and show the tag number of the locator device on the master control unit and the master control unit will advance to a search mode if desired, where the select button can be pressed and the master control unit will begin a search.

It is an object of the invention to provide a safety and tracking system that will alarm if the subject is being exposed to dangerously high or low temperatures, such as from a car, a beach or a stroller where a temperature sensor can be turned on or off.

What is really needed is a safety and tracking system that provides an agile antenna array that switches between a unidirectional monitoring antenna to a directional tracking antenna, where if a locator tag is out of the selected range the device will alarm and show the tag number of the locator device on the master control unit and the master control unit will advance to a search mode, or if desired, the select button can be pressed and the master control unit will begin a search if the subject tag alarms do to being exposed to dangerously high or low temperatures, such as from a car, a beach or a stroller, where tag's a temperature sensor can be turned on or off.

BRIEF DESCRIPTION OF THE DRAWINGS

The present invention will be described by way of exemplary embodiments, but not limitations, illustrated in the accompanying drawing in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
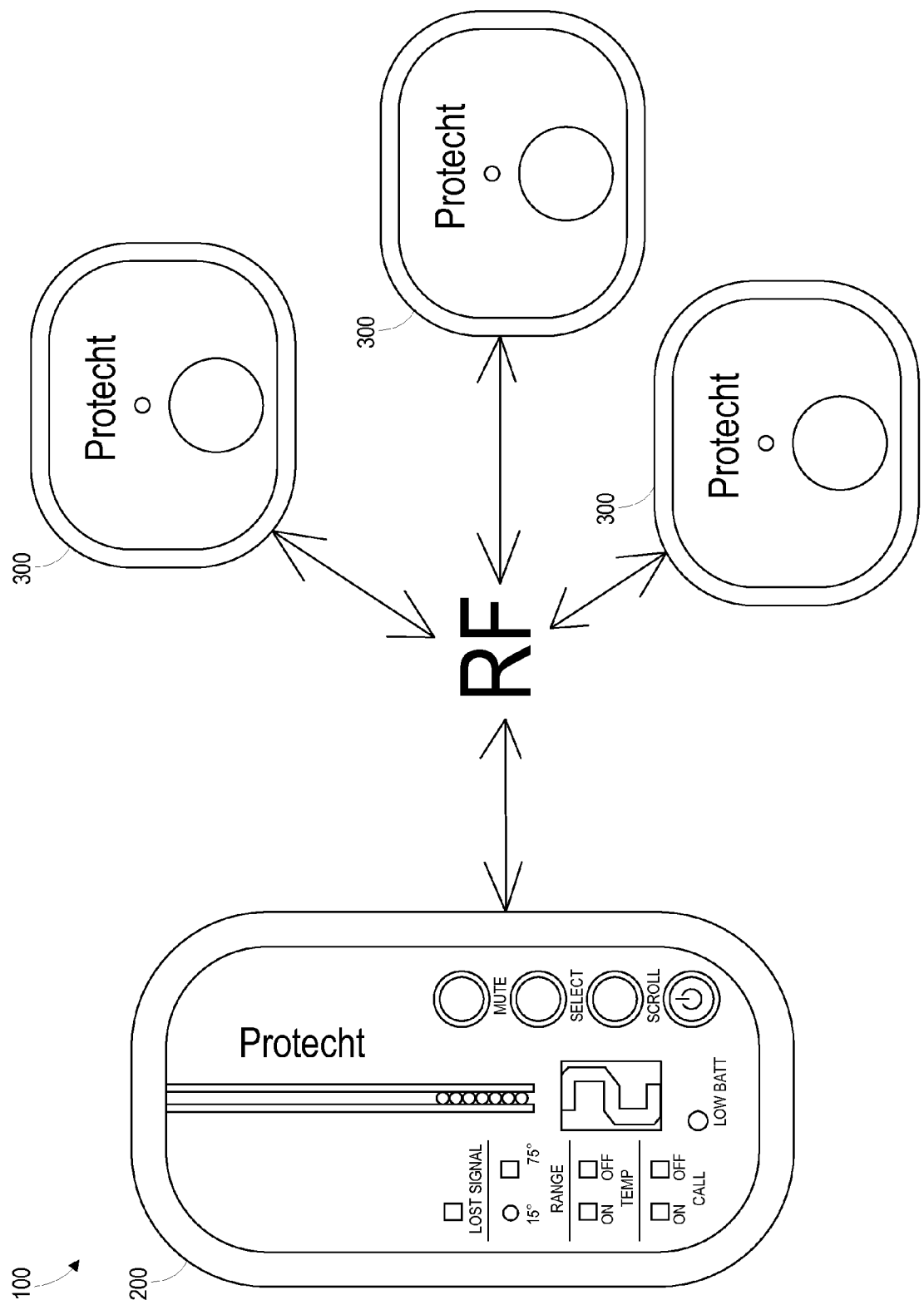
FIG. 1 illustrates a system overview of a safety and tracking system, in accordance with one embodiment of the present invention.

FIG. 1 illustrates a system overview of a safety and tracking system 100, in accordance with one embodiment of the present invention. The safety and tracking system 100 includes a master, or master control unit 200 and one or more targets, or locator tags 300. One parent may associate with one or more locator tags 300. The master control unit 200 and the locator tag 300 are approximate to one another and communicate child or parent status by radio over relatively short distances. If signals between the master control unit 200 and locator tag 300 are interrupted or other defined alarm conditions occur, the parent and locator tags 200, 300 present alarm indicators including visual, sound and vibrational feel. Further details regarding the master control unit 200 is outlined in FIG. 2A and FIG. 2B and further details regarding the locator tag 300 is outlined in FIG. 3A and FIG. 3B.

Figure 2A:
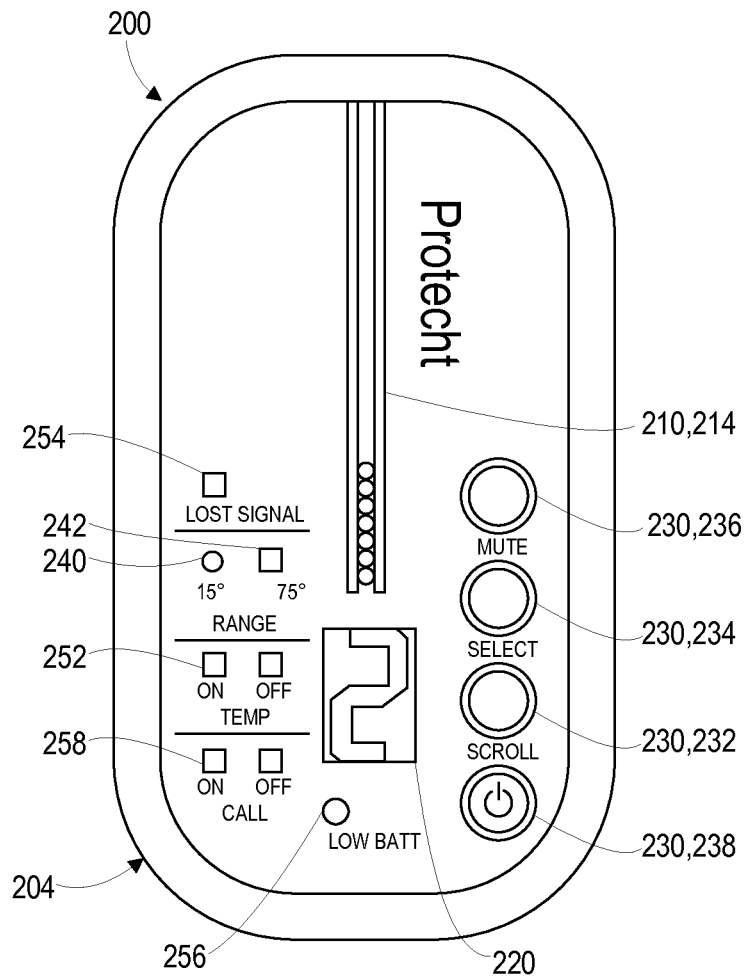
FIG. 2A illustrates a front perspective view of a master control unit, in accordance with one embodiment of the present invention.

FIG. 2A illustrates a front perspective view of a master control unit 200, in accordance with one embodiment of the present invention. The controls and indicators disposed on the master control unit 200 provide management control and display of status for the parent, in comparison to the locator tag 300 (See FIGS. 3A and 3B). The controls and indicators include a signal intensity indicator 210, a numerical indicator 220, a plurality of manual control buttons 230, and a plurality of indicator lights 250.

The signal intensity indicator 210 is an illuminated bar graph indicating the relative strength of the locator tag signal. The signal intensity indicator 210 is composed of a series of discrete visible indicators 214 disposed in a line. In search mode, the relative strength of the selected child unit signal is presented by one or more of the indicators 214 illuminated forming a rising and falling column as the relative detected strength of the locator tag 300 increases and decreases with changes in orientation between the locator tags 300 and the master control unit 200. The relative strength of the selected child unit signal is presented by sound of rising and falling frequency as the relative detected strength of the locator tag 300 increases and decreases with changes in orientation between the locator tags 300 and the master control unit 200.

The numerical indicator 220 is a digital display that provides numeric identity of a selected locator tag. The numerical indicator 220 is composed of elements that together form a discernable approximation of numbers and letters. The selected locator tag number is displayed here when a particular locator tag is being identified for location or pairing. Letters are displayed to provide instructions for input data to the parent.

The manual control buttons 230 include a scroll button 232, a select button 234, a mute button 236 and a power button 238 and provide input data to the parent. The LCD indicator lights 250 include a temperature warning light 252, a lost warning light 254, a low battery light 256 and a call light 258 to display various tracking functions.

The master control unit 200 is held by the parent at the lower half 204 of the master control unit 200 and is pointed towards the locator tag 300 target during any search operations. The master control unit 200 presents the indicators and controls disposed on the lower half 204 of the master control unit 200. All of the manual control buttons 230 such as the scroll button 232, the select button 234, the mute button 236 and the power button 238 are momentary push buttons. All indicator lights 250 that include the temperature warning light 252, the lost warning light 254, the low battery light 256 and the call light 258 emit light and a sound when activated. The signal intensity indicator 210 utilizes multi-color indicators and sound, but can also utilize other suitable types of lights and sound signals. The numerical indicator 220 utilizes a numeric display, but other suitable numeric displays can also be utilized. There is also a 15' range button 240 and a 75' range button 242.

The safety and tracking system was primarily designed to be an aid for parents when watching over their children in situations where extra caution may be needed, such as in a mall, a grocery store, a park, a zoo, an amusement park, while camping or hiking, in a lake, a pool, an outdoor gathering or other location. The safety and tracking system can also be used with mentally challenged, autistic or Alzheimer's patients to be assured that they do not wander from their caretakers. The safety and tracking system can also be used for pets. The safety and tracking system includes a master control unit that stays with a guardian or parent and a locator tag attached to a subject, such as a child, a pet, or an impaired adult being monitored. Additionally the master control unit can monitor multiple locator tags at one time. The safety and tracking system will not cross talk with other safety and tracking systems, even if multiple safety and tracking systems are being used in the same area, they will not interfere with the monitoring of each locator tag group.

The safety and tracking system includes a fence function with two perimeter settings of 15' or 75' that can be selected, although other suitable settings may be selected. If a subject moves out of the selected range, an alarm will sound on the master control unit. The master control unit will indicate the purpose of the alarm and which locator tag is alarming and give the option to search for the subject associated with the alarming locator tag.

The safety and tracking system also includes a search function, whereby if a subject is out of the set range, the safety and tracking system will alarm and show the tag number of the locator tag attached to the subject and the master control unit will advance to the search mode. If the guardian desires, the select button can be pressed and the master control unit will begin a search. Once in the search mode, the guardian slowly turns the master control unit in a 360 degree motion, whereby the master control unit is pointing in the direction of the subject and indicator lights and sound will signal the proper direction.

The safety and tracking system also includes a temperature function that utilizes a temperature sensor gauge that will alarm if the subject is being exposed to dangerously high or low temperatures, such as from a car, a beach, or a stroller. The temperature sensor can be turned on or off in the set-up mode. There is also a lost signal function, which signals that all contact with subject has been lost which could include when the subject is under water, out of signal range or the locator tag has been destroyed.

The safety and tracking system also includes an emergency call function. The subject's locator tag features a panic button that can be pressed if they are in danger, injured or scared. The locator tag will beep several times to indicate that a message was successfully sent to the master control unit. The master control unit will alarm and indicate which locater tag has been activated. The call function can be turned on or off at set-up depending on the subject's age or ability to understand its use. The safety and tracking system also includes a call all function that can be used by the guardian to call all locator tags at one time, such as indicating a time to go or come home. To use the call all function, the scroll button and select button are pressed simultaneously. In one embodiment of the invention, a pet can also be trained to return to their owner when the alarm sounds from the locator tag as well.

The safety and tracking system also includes a low battery function that the master control unit will indicate if batteries are low on any specific master control units or locator tags. A low battery indicator-will light up and the tag number of the locator tag will appear. There is also a mute button that can be used to quickly silence the alarm when desired whereby one push will mute only and two pushes will clear or reset the alarm.

The safety and tracking system also includes a scroll button that allows the guardian to scroll from one locator tag function to another, such as from on/off to distance.

Figure 2B:
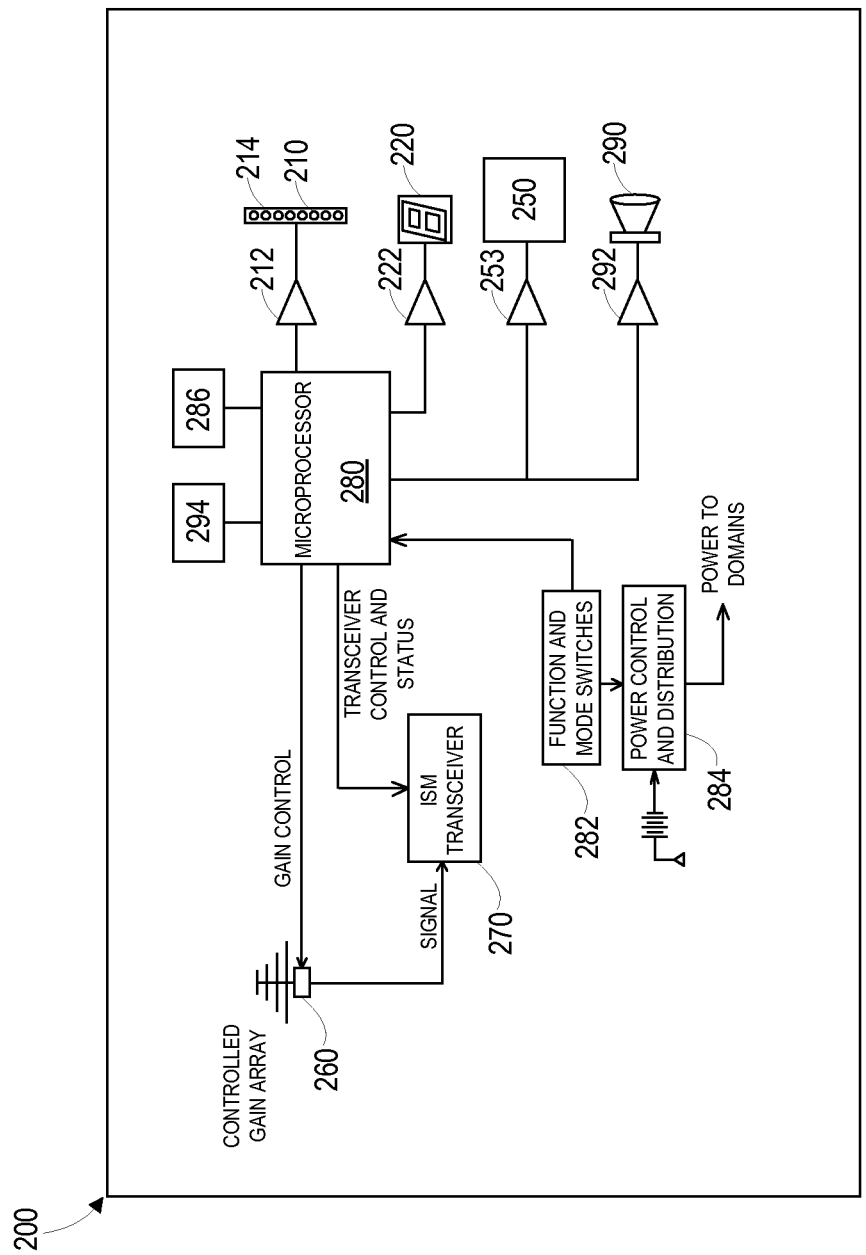
FIG. 2B illustrates an electrical diagram of a master control unit, in accordance with one embodiment of the present invention.

FIG. 2B illustrates an electrical diagram of a master control unit 200, in accordance with one embodiment of the present invention. The master control unit 200 relies on a controlled gain antenna array 260, an ISM transceiver 270 and a microprocessor 280 to monitor the locator tags 300 being managed, maintaining an awareness of the relative signal strength of the locator tags 300. Firmware 286 in the microprocessor 280 sends and receives data and control information with the ISM transceiver 270 to other locator tags 300. The microprocessor 280 also manages the ISM transceiver 270, the controlled gain antenna array 260, the signal intensity indicator 210, the numerical indicator 220, the plurality of manual control buttons 230, and the plurality of indicator lights 250.

The microprocessor 280 runs the firmware 286 that manages the ISM transceiver 270, the controlled gain antenna array 260, exchanges, sends and receives data with the ISM transceiver 270, manages the power supply and low-power states of domains, detects any control operation, illuminates the plurality of indicator lights 250 and activates an alarm sounder 290 that generates the audio sounds for the indicator lights 250 when activated. The alarm sounder 290 is a piezoelectric device that provides a discernable alarm-like sound for use as an alert signal, although other suitable alarm sound devices can be used. The microprocessor 280 is a low-power microprocessor, although other suitable microprocessors can be used.

The ISM transceiver 270 is a two-way radio that provides the physical communications link between the master control unit 200 and the locator tag 300. Any suitable transceiver can be used with the safety and tracking system 100, the master control unit 200 and locator tag 300. The ISM transceiver 270 interacts with the microprocessor 280 by providing status information including received signal strength of locator tags 300, providing received data from master control units 200 and locator tags 300, accepting frequency and transmits controls and accepting data for transmission. The ISM transceiver is a RF transceiver that includes RSSI. Other suitable transceivers can also be used.

Each of the controls and indicators on the master control unit 200 utilizes electronics that is specific to activating that particular indicator. The signal intensity indicator 210, a numerical indicator 220, a plurality of manual control buttons 230, and a plurality of indicator lights 250 will have special-purpose drivers 212, 222, 253, 292 for illumination or activation. Similarly, the sounder 290 has its own power switching considerations that are addressed by its purpose-specific driver components 292. There is also a plurality of function and mode switches 282 and power control and distribution switches 284 that control and direct power from a power source to the microprocessor 280.

The safety and tracking system 100 and all of the controls and indicators described in the FIG. 1, FIG. 2A and FIG. 2B descriptions are disposed on and integrated on one PCB substrate (not shown). The dimensions of the PCB are determined by the required dimensions of the controlled gain antenna array 260 based on an operating frequency. In the present embodiment, the width of the PCB is approximately 2". The same amount of depth is required for the controlled gain antenna array 260, forming a 2"×2" inch square area reserved for the controlled gain antenna array 260. The other controls and indicators are outside this space and are disposed on another 2"×2" inch square contains these other controls and indicators, forming a full PCB of approximately 2"×4" inches.

In the present embodiment, the master control unit 200 and the locator tag 300 have separate software architectures that are very similar. The locator tag 200 shares elements of the master control unit's core software architecture, but the locator tag software architecture is inherently relatively simple and relatively more limited in function. Both the parent control software 296 and the child control software (See FIG. 3B) run on the microprocessor 280 as a single application providing kernel management of the microprocessor 280 and its connected peripherals. The parent unit software 296 is composed of an interrupt-driven system kernel that manages precise timing and services necessary for operation of higher-level functions. These include high-level task function management for ISM radio frequency selection, ISM radio RSSI detection, antenna gain management, unit pairing and unpairing, signal threshold management (Perimeter), alarm signal detection and processing, RSSI indication, unit indication, miscellaneous visual and sounder indications.

Figure 3A:
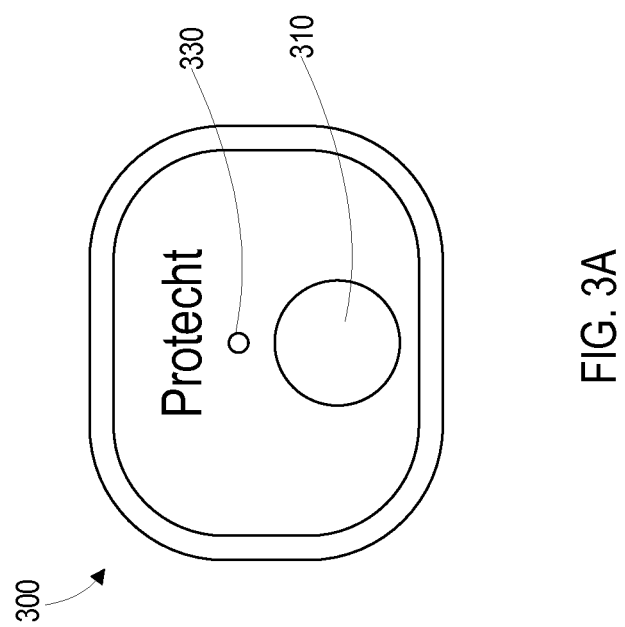
FIG. 3A illustrates a front perspective view of a locator tag, in accordance with one embodiment of the present invention.

FIG. 3A illustrates a front perspective view of a locator tag 300, in accordance with one embodiment of the present invention. The locator tag 300 is paired with a master control unit 200, although a relatively large number of locator tags 300 can be controlled by one master control unit 200. The locator tag 300 includes a panic button 310 to send an alarm signal to a master control unit 200, and an indicator light 330 that illuminates to signal specified information is being sent to a user.

Figure 3B:
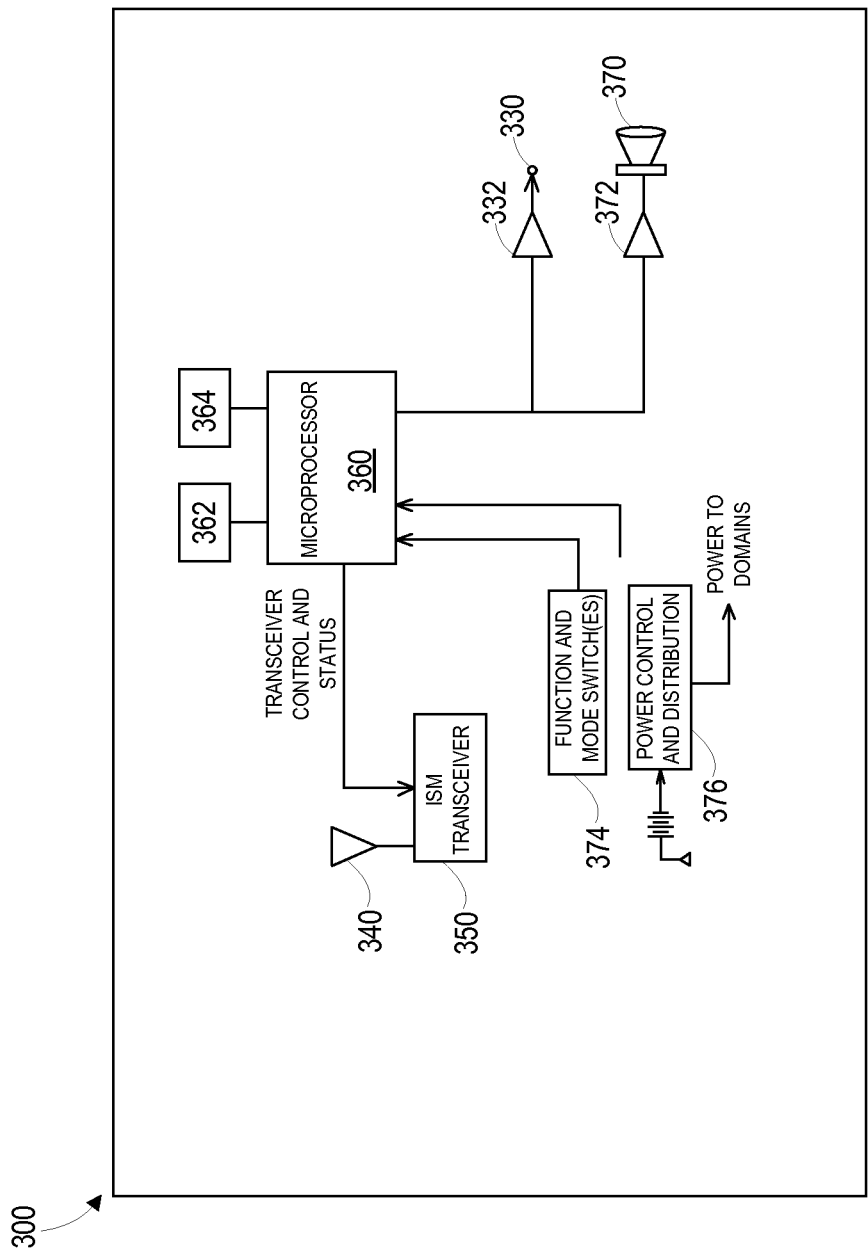
FIG. 3B illustrates an electrical diagram of a locator tag, in accordance with one embodiment of the present invention.

FIG. 3B illustrates an electrical diagram of a locator tag 300, in accordance with one embodiment of the present invention. The locator tag 300 utilizes a single antenna 340, an ISM transceiver 350 and a microprocessor 360 to coordinate with the master control unit 200 to which it is paired. Communication between the locator tag 300 and the master control unit 200 allows the master control unit 200 to maintain an awareness of the relative bearing and separation distance between the master control unit 200 and the locator tag 300. The single antenna 340 is a single, omni-directional antenna for communication with the master control unit 200, although any type of suitable antenna can be used.

The microprocessor 360 can run firmware 362 that manages the ISM transceiver 350, manages the power supply and low-power states of domains, detects when the panic button 310 is depressed, illuminates the indicator 330 and activates an alarm sounder 370. The ISM transceiver 350 is a two-way radio that provides the physical communications link between the master control unit 200 and the locator tag 300. It interacts with the microprocessor 360 by providing status information including received signal strength, providing received data, accepting frequency and transmitted controls and accepting data for transmission. The ISM transceiver 350 can be any single-chip RF transceiver suitable for paired communication with the parent.

The indicator 330 and sounder 370 will have special-purpose drivers 332, 372 for illumination and activation. A small alarm sounding component device provides a discernable alarm-like sound for use as an alert signal by the sounder 370, although other suitable alarm sounding components can be used. There is also a plurality of function switches 374 and power control and distribution switches 376 that control and direct power from a power source to the microprocessor 360 that is regulated and managed to maintain proper voltage levels and switching for all domains. Power to all domains is controlled by the plurality of function switches 374 and power control and distribution switches 376 to minimize power consumption to save energy and to extend battery life. The microprocessor is a low-power microprocessor, although any suitable microprocessor can be used.

The locator tag hardware architecture includes all of the electronics described in the previous paragraph and the single antenna 340 all integrated on one PCB substrate (not shown). The dimensions of the PCB substrate are determined by the required dimensions of the single antenna 340 based on operating frequency. In the present embodiment, the width of the PCB is approximately 1" with approximately one half inch of depth required for the single antenna 340, forming a 1"×0.5" area reserved for the single antenna 340. The electronics described in the previous paragraph, previously described controls and indicators are disposed on an additional 1"×1" inch square forming a total PCB substrate of approximately 1"×1.5".

The locator tag 300 has a kernel component similar to the master control unit 200 with reduced functionality and management. All software runs on the microprocessor 360 as a single application providing kernel management of the microprocessor 360 and its connected peripherals. The locator tag software 364 is composed of an interrupt-driven system kernel that manages precise timing and services necessary for operation of higher-level functions such as ISM radio frequency selection, unit pairing and unpairing, alarm signal initiation, visual indication and sounder indication.

Figure 4:
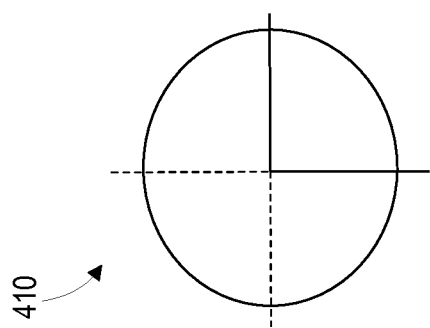
FIG. 4 illustrates characteristic directional and omni-directional antenna patterns from the controlled gain array, in accordance with one embodiment of the present invention.
Figure 4:
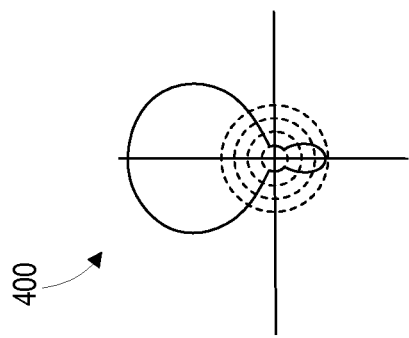

FIG. 4 illustrates characteristic directional and omni-directional antenna patterns 400, 410 from the controlled gain array, in accordance with one embodiment of the present invention. A configurable antenna array provides omni- and narrow-beam directed-antenna operation 400, 410, controlled by the microprocessor 280. When in omni-directional mode the antenna has approximately equal sensitivity in all directions. In directional mode the antenna is much more sensitive in its forward direction than the side directions and back directions. These two modes are used to respectively monitor the normal state and presence of the locator tags and provide a narrow beam of sensitivity for directional searching for a locator tag.

The safety and tracking system 100, the master control unit 200 and the locator tag 300 provide distance tracking with adjustable ranges, temperature monitoring that will indicate whether a tracked person or child is being exposed to temperatures that are either too hot or too cold, alert the parent or guardian audibly or on vibrate mode when any of monitored conditions are breached, send an audible alert when there is a loss of signal, such as when a master control unit 200 or locator tag 300 is in water and offer simple tracking capabilities based on direction and distance.

The safety and tracking system 100, the master control unit 200 and the locator tag 300 also provide RF signals to communicate between the master control unit 200 and locator tag(s) 300. The master control unit 200 will activate an alarm or vibrate if the monitored child or pet goes outside the distance range set by the parent. If the parent cannot see the child or pet they can listen for the alarm to locate them. If the parent cannot hear monitored child or person, a master control unit 200 will signal with a flashing light when it is pointed in the direction of the missing person or child and the flashing light will blink faster and the sounder will beep faster as the parent gets closer. The safety and tracking system 100, the master control unit 200 and the locator tag 300 also will continually monitor temperature and will activate an alarm if the monitored person, child or pets temperature is outside a safe range, activate an alarm if there is a loss of signal and will signal and indicate if any batteries are low.

The safety and tracking system 100, the master control unit 200 and the locator tag 300 can be used by families with children, schools that would track multiple children on a class trip, home care centers that want to track their clients or patients, such as those with Alzheimer disease, the military that could use the units 200, 300 to be monitored remotely and discretely, campers, emergency services personnel, insurance companies that insure valuable executives on foreign business or any group where safety, security and location is important.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A safety and tracking system, comprising: a master or master control unit that includes signal intensity indicators to indicate a relative strength of a received signal, a numerical indicator that indicates an identity of a tracked receiving unit, a plurality of manual control buttons that provide input data to said master control unit, a plurality of indicator lights with a sounder to display various tracking functions, a controlled gain antenna array that exchanges, sends and receives said input data, a transceiver that provides a communications link between said master control unit and said tracked receiving unit and a microprocessor that manages said transceiver, said controlled antenna array, said signal intensity indicator, said numerical indicator, said manual control buttons, and said indicator lights; and one or more target or locator tags that serve as said tracked receiving units to said master control unit that include a panic button to send said received signal to said master control unit, an indicator light with a sounder that illuminates when said input data from said master control unit is received, an antenna that exchanges, sends and receives said input data, a transceiver and a microprocessor to coordinate said input data to said master control unit, and wherein said master control unit includes software composed of system kernel that performs high-level task function management for ISM (industrial, scientific, and medical (ISM) radio bands) radio frequency selection, ISM radio RSSI (received signal strength indicator) detection, antenna gain management, said locator tag pairing and unpairing, signal threshold management, alarm signal detection and processing, RSSI indication, said locator tag indication and said sounder indication and will not cross talk with other locator tags.

2. The system according to claim 1, wherein said signal intensity indicator is an illuminated bar graph with LED lights disposed in a column that rise and fall along said column to indicate said relative signal strength.

3. The system according to claim 1, wherein said numerical indicator is a display that is a number or any upper or lower case letter.

4. The system according to claim 1, wherein said manual control buttons include a scroll button, a select button, a mute button and a power button.

5. The system according to claim 1, wherein said indicator lights include a temperature warning light, a lost warning light, a low battery light and a call light.

6. The system according to claim 1, wherein said transceivers are RF ISM transceivers that include RSSI.

7. The system according to claim 1, wherein said master control unit microprocessor utilizes firmware to send and receive said input data to said locator tags.

8. The system according to claim 7, wherein said firmware manage said transceivers and said controlled gain antenna array, exchanges, sends and receives data with said transceivers, manages a power supply and low-power states of domains, illuminates said plurality of indicator lights and activates said sounders that generates audio sounds when said indicator lights are activated.

9. The system according to claim 1, wherein said master control unit sounder is an electromechanical sound generating device.

10. The system according to claim 1, wherein said master control unit and said locator tag are each disposed on and integrated on one or more PCB substrate.

11. The system according to claim 1, wherein said controlled antenna array utilizes a unidirectional antenna to monitor said locator tags and a directional antenna to track said locator tags and can switch between said unidirectional antenna to said directional antenna.

12. The system according to claim 1, wherein said transceivers interact with said microprocessors by including said received signal strength, providing said input data, accepting frequency and transmitted controls and accepting said input data for transmission.

13. The system according to claim 1, wherein said locator tag includes software composed of a system kernel that manages precise timing and services necessary for operation of higher-level functions such as ISM radio frequency selection, said locator tag pairing and unpairing, alarm signal initiation, visual indication and sounder indication.

14. The system according to claim 1, wherein said locator tag sounder is an electromechanical sound generating device.

15. A safety and tracking system, comprising:
a master or master control unit that includes a signal intensity indicator with an illuminated bar graph with LED (Light Emitting Diode) lights disposed in a column that rise and fall along said column to indicate a relative signal strength, a sound of rising and falling frequency to indicate a relative signal strength, a numerical indicator that is a number letter that indicates an identity of a tracked receiving unit, a plurality of manual control buttons that include a scroll button, a select button, a mute button and a power button that provide input data to said master control unit, a plurality of indicator lights with a sounder that is an electromechanical sound generating device that include a temperature warning light, a lost warning light, a low battery light and a call light to display various tracking functions, a controlled gain antenna array that utilizes a unidirectional antenna to monitor said locator tags and a directional antenna to track said locator tags and can switch between said unidirectional antenna to said directional antenna, an RF ISM (industrial, scientific, and medical (ISM) transceiver that RSSI (received signal strength indicator) that provides a communications link between said master control unit and said tracked receiving unit and a microprocessor with firmware to send and receive said input data to said locator tags that manages said transceiver, said controlled antenna array, said signal intensity indicator, said numerical indicator, said manual control buttons, said indicator lights, and said sounding device, said master control unit is disposed on and integrated on one or more PCB (Print Circuit Board) substrate; and
one or more target or locator tags that serve as said tracked receiving units to said master control unit that include a panic button to send said received signal to said master control unit, an indicator light with a sounder that is an electromechanical sound generating device that illuminates when said input data from said master control unit is received, a single antenna is a omni-directional antenna that exchanges, sends and receives said input data, a RF ISM (industrial, scientific, and medical (ISM) transceiver that includes RSSI (received signal strength indicator) and a microprocessor to coordinate said input data to said master control unit, said master control unit is disposed on and integrated on one or more PCB (Print Circuit Board) substrate.

16. The system according to claim 15, wherein said firmware manage said transceivers and said controlled gain antenna array, exchanges, sends and receives data with said transceivers, manages a power supply and low-power states of domains, illuminates said plurality of indicator lights and activates said sounders that generates audio sounds when said indicator lights are activated.

17. The system according to claim 15, wherein said master control unit includes software composed of a first system kernel that performs high-level task function management for ISM radio frequency selection, ISM radio RSSI detection, antenna gain management, said locator tag pairing and unpairing, signal threshold management, alarm signal detection and processing, RSSI indication, said locator tag indication and said sounder indication and will not cross talk with other locator tags.

18. The system according to claim 15, wherein said transceivers interact with said microprocessors by including said received signal strength, providing said input data, accepting frequency and transmitted controls and accepting said input data for transmission.

19. The system according to claim 15, wherein said locator tag is composed of a second system kernel that manages precise timing and services necessary for operation of higher-level functions such as ISM radio frequency selection, said locator tag pairing and unpairing, alarm signal initiation, visual indication and sounder indication.

* * * * *